MOTOR CONTROL FOR SIGNAL RESPONSIVE SELECTOR MECHANISM

Filed June 15, 1950

INVENTOR
A. R. EGGENSPERGER
BY [signature]
ATTORNEY

Patented Oct. 2, 1951

2,569,980

UNITED STATES PATENT OFFICE 2,569,980

MOTOR CONTROL FOR SIGNAL RESPONSIVE SELECTOR MECHANISM

Arlo Raleigh Eggensperger, Tenafly, N. J., assignor to American Telephone and Telegraph Company, a corporation of New York Application June 15, 1950, Serial No. 168,365

5 Claims. (Cl. 178—4.1)

Figures 1, 1A:
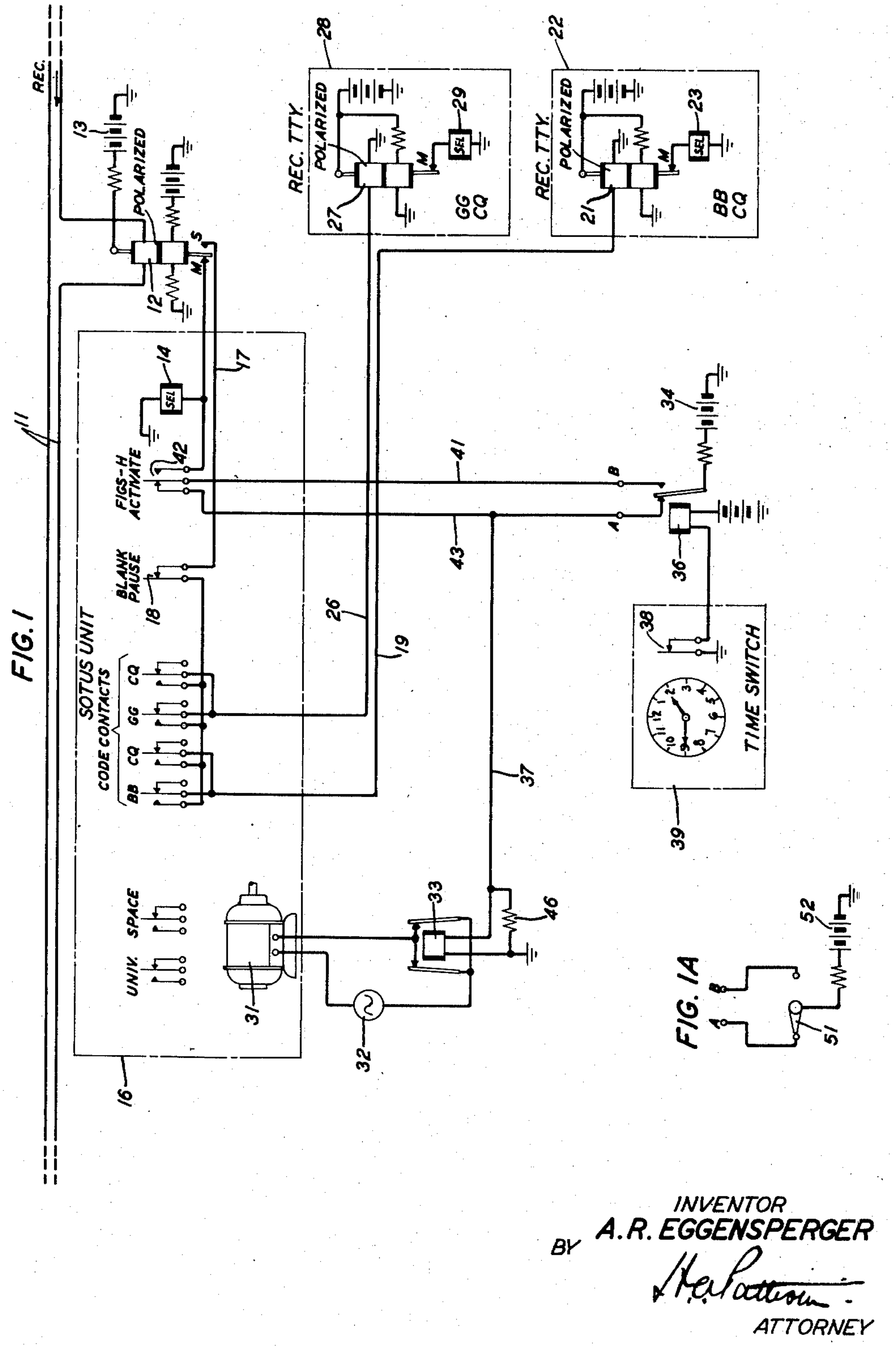

This invention relates to telegraph systems and apparatus and particularly to signal responsive selector mechanism employed in selective switching circuits.

More specifically, the invention relates to the controlment of the electric motors by which signal responsive selector mechanisms are driven.

In copending application Serial No. 119,184, filed October 1, 1949, by W. M. Bacon, G. J. Knandel, J. A. Krecek, and G. A. Locke, there is disclosed an automatic teletypewriter switching system in which messages preceded by address codes designating one or more addressee stations to receive the messages are automatically routed under the control of the address codes through switching centers and over trunks and telegraph lines to the addressee stations, where the messages are recorded. Among the various kinds of lines disclosed in the application are party lines having a plurality of subscriber stations which selectively receive messages transmitted from a switching center, the selection of a station or stations on a party line to receive a message being under the control of an address code or codes preceding the message.

As disclosed in, the copending application each party line is provided with one or more subordinate switching centers, depending upon the number of subscriber stations associated with the party line, each subordinate switching center serving a few subscriber stations. Each of the subordinate switching centers includes a monitoring selector connected to the party line channel over which messages are transmitted from the primary switching center, the monitoring selector being characterized as a sequentially operated teletypewriter universal selector, and it will hereinafter be referred to by a name derived from the initial letters of that characterization, namely SOTUS unit. It is arranged to receive permutation code telegraph signals and to operate selectable elements in response to the reception of code combinations. It is provided with interlocking latches by means of which certain of the selectable elements may respond to their assigned code combinations only upon being unlatched or prepared for operation by the signal responsive operation of a selectable member in response to a different code combination or the same code combination, from which it follows that the first-mentioned selectable member is operable only in response to reception of the particular two code combinations in sequence. Three or four or five or more of the selectable members may be interlocked so that the ultimate selection depends upon the reception of a predetermined sequence of code combinations. The monitoring selector equipment is described in the specification of the copending application and is shown in Figs. 186 to 190, inclusive, of that application. In addition, it is described in considerably greater detail in copending applications Serial No. 739,747, filed April 7, 1947, by W. J. Zenner, and Serial No. 44,084, filed August 13, 1948, now Patent No. 2,543,174, dated February 27, 1951, by G. G. Keyes and G. Sim.

The monitoring selector mechanism or SOTUS unit has, as described in the above-identified copending application, two basic operating conditions, one being described as an activate condition and the other being described as a deactivate condition. In the activate condition of the monitoring selector mechanism the selectable elements that are selectable in response to predetermined sequences of code combinations to effect the routing of messages to the related subscriber station are in an unblocked condition whereby they may respond to signals to effect the routing of messages. In the deactivate condition those selectable elements are mechanically blocked against selection, and signals intervening the address codes and the text of a message place the monitoring selector mechanism in the deactivate condition for the purpose of preventing the selection of subscriber stations in response to sequences of characters occurring in the text of the message that are also employed as address codes.

It is an object of the present invention to estop the opening of the energizing circuit for the motor that drives a signal responsive selector mechanism except when that mechanism is in a particular selecting condition.

Another object of the invention is to provide that the particular selecting condition shall be that of a capability of performing switching operations, sometimes described as an activate condition.

Another object of the invention is to completely desensitize the selector mechanism against signal response while the energizing circuit of the driving motor is open.

In the operation of teletypewriter switching systems such as the one disclosed in the copending application of Bacon et al., some portions of the system, such as main switching centers, may be in continuous operation day and night, whereas it may be desirable to shut down other portions of the system during one or more periods of time in a twenty-four hour interval, or on holidays and week-ends, and apparatus involved in such shutting-down may include one or more of the subordinate switching centers associated with party lines. One of the operations to be performed in the shutting-down of such subordinate switching centers is the stopping of the driving motors of the SOTUS units included in those switching centers, since there is no point permitting the motor to run if the subordinate switching center is shut down. If the motor of a SOTUS unit should be shut down while that unit is in the deactivate condition, it would remain in this condition while the motor was shut down and after it had been restarted at a later resumption of normal operation, and until the subsequent transmission, from the principal or primary switching center serving the party line, of signals to which the SOTUS unit is selectively responsive to change it from the deactivate to the activate condition. In the interval between the restarting of the motor and reception of the activate signal, the SOTUS unit would be incapable of performing selective switching operations in response to received address codes, and a message directed by its address codes to one or more of the subscriber stations served by the SOTUS unit might be lost and not received by those stations because of the deactivate condition of the SOTUS unit.

In order that the loss of messages under circumstances set forth above may be avoided, and for the accomplishment of the objects hereinbefore set forth, the invention features motor circuit control means supervised in accordance with the activate or deactivate condition of the SOTUS unit, so that the motor circuit control means cannot open the circuit of the motor unless and until the SOTUS unit is in the activate condition.

The invention also features an arrangement for establishing a shunting circuit around the input to the selector magnet of the SOTUS unit when the motor has been shut down under the supervision above set forth, so that the SOTUS unit shall be unresponsive to signals on the telegraph channel with which it is associated while the motor is shut down.

For a complete understanding of the invention reference may be had to the following detailed description to be interpreted in the light of the accompanying drawings in which:

Fig. 1 is a schematic circuit diagram showing a motor control arrangement in accordance with the present invention; and Fig. 1A is a schematic circuit diagram showing a circuit substitution for a portion of Fig. 1.

Fig. 1 contains substantial portions of Figs. 16 and 29 of the copending application of Bacon et al., and comprises a subordinate or secondary switching center arranged to control the routing of messages received from a main switching center to either or both of two subscriber stations. Messages are received from the main switching center or station over a telegraph channel 11. The relation of Fig. 1 to Figs. 16 and 29 of the Bacon et al. application from which it is derived is such that the main switching station may be considered as located at a point distant from the right-hand side of Fig. 1, so that the subordinate switching center shown in Fig. 1 receives signals from the right, and other subordinate switching centers may intervene the main switching center and the subordinate switching center shown in Fig. 1. Also the channel 11 may extend leftwardly beyond Fig. 1 to other subordinate switching centers.

The subordinate or secondary switching center shown in Fig. 1 has line relay 12 connected in channel 11 so as to respond to all signals transmitted over the channel. The operating winding of relay 12 is connected in channel 11 and operates the armature of the relay to its marking contact in response to marking signals on line 11. The biasing winding of relay 12 tends to operate the armature to the spacing contact, and when spacing signals are transmitted over channel 11, the biasing winding of relay 12 operates the armature to the spacing contact.

The armature of relay 12 is connected to battery 13 and the marking contact is connected to one terminal of the winding of selector magnet 14 of the SOTUS unit, which is represented by the apparatus contained within the dotted line rectangle 16. In addition to being shown and described in the copending applications of Bacon et al., Zenner, and Keyes et al., hereinbefore identified the SOTUS unit is fully shown and described in a publication entitled "Teletype Printing Telegraph Systems, Description and Adjustments, Sequential Selector, Bulletin No. 204, issue 1, July 1, 1948," which was published by Teletype Corporation and which carries the copyright registration notice "Copyright 1948 by Teletype Corporation." The disclosures of the several copending applications as well as that of the above-identified publication are incorporated herein by reference as part of the present specification so that a complete understanding of the present invention to be described herein may be had from the present specification as supplemented by the disclosures of the copending applications and the publication.

With receiving relay 12 in the marking condition the circuit of selector magnet 14 is completed and this magnet is energized. When relay 12 responds to a spacing signal it interrupts the energizing circuit of selector magnet 14 and in this way repeats received signals to the selector magnet. The SOTUS unit has code contacts that are operable selectively to connect the receiving relays of subscriber stations to the spacing contact of the receiving relay 12. Some of these code contacts are responsive to individual address codes and some are responsive to group codes, each set of code contacts being operable only in response to its assigned sequence of two call directing codes comprising a message address, the first code causing the selection of a selectable member that unblocks the selectable member that responds to the second address code, and the last-mentioned selectable member, when operated, closing its associated contacts. The manner in which switching or code contacts are closed in response to a sequence of two address codes is described in the copending application of Bacon et al.

Four sets of switching code contacts are shown in Fig. 1, one set being designated as responsive to the address code BB, another being responsive to the address code GG and two sets being responsive to the address code CQ. When selector magnet 14 responds to the address code BB, for example, it causes the swinger of the code contacts so designated to engage the left-hand contact, thereby extending a conductive path from the spacing contact of receiving relay 12 through conductor 17, normally closed contacts 18, the function of which is fully described in the copending application of Bacon et al. and need not be considered here, closed code contacts designated BB, conductor 19, and to ground through operating winding of receiving relay 21 of receiving teletypewriter subscriber station 22 designated by the individual address code BB. Receiving relay 21 operates upon an inverse neutral basis, that is, the circuit of its operating winding is open for the marking condition, the armature being operated to the marking contact by current in the biasing winding, the circuit of the operating winding being closed in the spacing condition, the current then flowing in the operating winding overcoming the effect of the biasing winding and driving the armature away from the marking contact. The armature of receiving relay 21 is connected to battery and there is connected to the marking contact of the relay the winding of selector magnet 23 of a receiving teletypewriter printer which may be of the type disclosed in patent 1,904,164 granted April 18, 1933, to S. Morton et al. The disclosure of the Morton et al. patent is incorporated herein by reference as exemplifying a well-known form of teletypewriter printer.

Similarly, a conductive path is traced from the spacing contact of receiving relay 12 through conductor 17, contacts 18, the code contacts designated GG, when the swinger of those contacts engages the left-hand contact following response of the SOTUS unit to the address code GG, conductor 26 and operating winding of receiving relay 27 of receiving teletypewriter subscriber station 28. Relay 27 repeats signals retransmitted by receiving relay 12 to the selector magnet 29 of a teletypewriter printer. When the SOTUS unit receives the address code CQ which is a group code, both sets of code contacts designated CQ close to extend paths from the spacing contact of receiving relay 12 in parallel to repeating relays 21 and 27.

As may be learned from the detailed description of the SOTUS unit in the Bacon et al. copending application, the carriage return and line feed signals perform a deactivate function in the SOTUS unit to the extent that they render effective a mechanical blocking member to prevent operation of the code contacts such as BB, GG and CQ, so that the code contacts will not be selectively operated in response to letter sequences occurring in the body of a message that are the same as address codes. An end-of-message signal, comprising the signals for FIGURES and H, performs an activate function in the SOTUS unit, namely it disables the blocking member which the deactivate signal renders effective upon the code contacts so that they may be selected in response to their proper sequence of codes. Since all proper messages terminate with the end-of-message signal it is to be assumed that at the time of transmission, on telegraph channel 11, of a message preceded by address code such as BB or GG, the SOTUS unit will be in the activate condition because the message last previously received will have been terminated by the end-of-message sequence of signals, FIGURES and H. It is also set forth in that description of operation of the SOTUS unit that when any code contacts are operated by their selectable members, those members latch operated, remain operated after the deactivate signal has been received and are unlatched and their code contacts released only in response to the end-of-message code, FIGURES and H.

SOTUS unit 16 is provided with a driving motor 31 which is powered from a source of alternating current 32, which may be considered as representing the usual power supply mains, through the armatures and front contacts of relay 33. Relay 33 is energizable in a circuit from battery 34, through the armature and front contact of relay 36, conductor 37 and the winding of relay 33 to ground. Relay 36 is shown as being energizable through the make contacts 38 of a clock-controlled time switch represented schematically within the dotted line rectangle 39. Switches of this type are well known, they being arranged to close and open the contacts which they control in accordance with a preset program. The invention of the present application is particularly useful when the starting and stoping of motor 31 is controlled by clock-operated contacts without regard to transmission on telegraph channel 11. This is in contradistinction to control of the circuit of motor 31 by manually operable contacts operable by an attendant who could operate them in accordance with the condition of telegraph channel 11 as regards transmission. In Fig. 1, the clock-controlled contacts 38 have been shown closed, the relay 36 being thereby operated and the relay 33 in turn operated so that motor 31 is running.

Relay 36 is provided with a back contact which is connected by conductor 41 to the swinger of a set of transfer contacts 42 designated "Figs.-H Activate." These are contacts that are controlled by the selectable member which responds to the end-of-message signal, FIGURES and H.

It is set forth in the specification of the Bacon et al. application that the selectable element that responds to the code H of the end-of-message signal, and places the SOTUS unit in the activate condition by unblocking the code contact selectable members, also operates contacts in the same manner as the code contact selectable members and that in the system disclosed in that application no use is made of the activate contacts. The contacts 42 in Fig. 1 correspond to those described in the Bacon et al. application as not being used, and as will shortly be described, are used in the present invention. It is also set forth in the Bacon et al. application that a contact operating selectable member may be latched in the operated condition to hold the associated contacts operated or off-normal, and that the latch may be released in the next cycle of operation of the SOTUS unit, regardless of the character of the received signal that initiates that cycle, or alternatively that the selectable member which is latched and holding the contacts operated may be released in response to particular received signals or sequence of signals. For example, it is set forth in that application that any of the code contacts, upon being latched operated, are released only in response to the end-of-message signal, FIGURES and H, which is also the activate signal. Similarly, for the purposes of the present invention, the contacts 42 that are operated and latched in response to the activate signal which is the end-of-message sequence FIGURES and H, remain latched until the deactivate signal is received, this being the carriage return signal or the line feed signal.

The contacts 42 have been shown in the deactivate condition of the SOTUS unit, which is their unoperated or unlatched condition, with the swinger engaging the left-hand contact, which is connected by conductor 43 and conductor 37 to the winding of motor circuit control relay 33. The right-hand contact, which is engaged by the swinger when it is moved to and latched in its operated condition in response to the end-of-message signal, is connected to the terminal of selector magnet 14 of the SOTUS unit to which the marking contact of relay 12 is connected.

The condition of the apparatus shown in Fig. 1 is that SOTUS unit 16 is in operation, motor 31 is running, the SOTUS unit is in the deactivate condition, neither of the subscriber stations 22 and 28 is connected to receive a message but there is transmission on telegraph channel 11, presumably to a subscriber station controlled by another SOTUS unit associated with the channel, it being reasonable to assume such transmission since SOTUS unit 16 is in the deactivate condition whereas if there were no message transmission the last previously transmitted message should have terminated with an end-of-message signal which would have resulted in restoration of SOTUS unit 16 to the activate condition, with the swinger of contact 42 moved to engagement with the right-hand contact.

It will be assumed that while the above-described conditions exist time switch 39 opens the contacts 38, thereby interrupting the energizing circuit of relay 36 which releases. The armature of that relay moves into engagement with the back contact, and a circuit is traced from battery 34 through conductor 41, the swinger and left-hand contact of contacts 42, conductors 43 and 37 and winding of relay 33 to ground. Thus, although time switch 39 has sought to open the circuit of motor 31 in order to shut down SOTUS unit 16, the motor remains in operation due to the fact that the SOTUS unit is in the deactivate condition. Resistor 46 connected in shunt with the winding of relay 33 imparts to that relay a slow-release characteristic which holds it operated during the travel time of the armature of relay 36, so that the circuit of motor 31 is not momentarily opened while relay 36 is releasing.

At the end of the message which has been in the process of transmission to some other subscriber station on telegraph channel 11, the end-of-message signal is received by selector magnet 14 to restore the SOTUS unit to the activate condition, this operation being accompanied by movement of the swinger of contacts 42 from the left-hand to the right-hand contact, in which condition the contacts latch. At the swinger and left-hand contact the circuit of relay 33 is interrupted and the relay releases after a delay interval as previously stated. A circuit is completed from battery 34 through the armature and back contact of relay 36, conductor 41, swinger and right-hand contact of the contacts 42, and winding of selector magnet 14 to ground. The selector magnet 14 is blinded or held energized over this circuit so that it is unresponsive to interruptions of its normal energizing circuit at the armature and marking contact of receiving relay 12. With selector magnet 14 blinded, subsequent transmission on telegraph channel 11, which may follow immediately the message just concluded, will operate receiving relay 12 but selector magnet 14 will not respond to those signals and the selector mechanism and other power driven elements of the SOTUS unit will not be operated by motor 31 while it is coasting to a stop. With motor 31 stopped and selector magnet 14 blinded the SOTUS unit is completely shut down.

It will now be assumed that some period of time later, in accordance with the programming of time switch 39, contacts 38 reclose, completing the energizing circuit of relay 36 which immediately completes the energizing circuit of relay 33 and removes the holding battery connection from selector magnet 14. Motor 31 is immediately set in operation and selector magnet 14 follows the signals then being transmitted on telegraph channel 11 if transmission is in progress. If there is no transmission in progress the next transmission should be an address code or address codes preceding a message and the SOTUS unit 16 is in the activate condition so that its code contacts are capable of responding to address codes to connect the subscriber station 22 or 28 to receive the message. In this way the SOTUS unit is in proper condition, upon resumption of operation, to respond to switching codes.

Let it be supposed now that contacts 42 had not been provided, and that relay 33 is solely under the control of relay 36. Immediately upon the opening of contacts 38 the relay 36 would release, in turn releasing relay 33. If SOTUS unit 16 were in the deactivate condition at the time of the release of relay 33 it would remain in this condition while the SOTUS unit 16 is shut down and would be in the deactivate condition when, in accordance with the programming of the time switch 39, contacts 38 reoperated relay 36, this relay in turn reoperating relay 33. The SOTUS unit 16 would not be restored to the activate condition, in which its code contacts could be operated in response to message address codes, until the end-of-message signal terminating any message then in the process of being transmitted, or terminating the next message to be transmitted, had been received. If there had been no transmission on telegraph channel 11 at the time of restarting of motor 31 and the next message transmitted should have preceding it the address code BB or GG or CQ, the SOTUS unit 16 would be incapable of responding to these address codes and neither of the stations 22 or 28 would receive a message addressed to it. With the arrangement shown in Fig. 1 including the contacts 42 and the back contact of relay 36, such loss of messages is avoided.

Consideration will now be given to one aspect of the invention as disclosed under the previously described circumstance that the SOTUS unit 16 has been shut down for a time and restarted by time switch 39 and that at the time of restarting the motor message transmission is in progress on telegraph channel 11. The SOTUS unit 16 is, of course, in the activate condition and it will be supposed that included in the text of the message is a word such as "baggage" which contains the sequence of characters GG. Because of the fact that the SOTUS unit is in the activate condition, in which received signals are interpreted as address codes, the code contacts designated GG will be operated to connect the receiving relay 27 of teletypewriter subscriber station 28 to the back contact of receiving relay 12, and the station 28 will receive the remainder of a message not intended for it. Likewise, the appearance in the text of the message of another sequence of characters which is the same as an address code, such as the address code BB, will cause the subscriber station having that address code to be connected to receive the remainder of the message. The appearance, as part of the message, of the carriage return or line feed signal, or both, which are bound to appear in messages exceeding one line in length, and the response of selector magnet 14 thereto will result in the deactivation of SOTUS unit 16, which is a mechanical blocking of the code contacts against selection and operation of the swinger of contacts 42 to its left-hand contact, as previously described, and the connection of a teletypewriter station in response to subsequently received sequences of characters corresponding to address codes will be prevented. The possibility of unintentional connection of a station to receive part of a message not intended for it is very clearly to be preferred over the previously described possibility of loss of an entire message that might result from shutting down of the SOTUS unit when in the deactivate condition. Moreover, the frequency of occurrence, between the restarting of motor 31 and deactivation of the SOTUS unit by carriage return-line feed signals, of a sequence of codes that would unintentionally connect a subscriber station is likely to be very low and not objectionable.

A substitution of a simple single-pole double-throw switch for the combination of time switch 39 and relay 36 is indicated in Fig. 1A. The switch, designated by the reference numeral 51, has its swinger or contactor connected to battery 52 and its left and right-hand contacts connectable to the points A and B in Fig. 1 in substitution for the front and back contacts respectively of relay 36. With switch 51 employed, the shutting down of the SOTUS unit 16 is not time-controlled automatically but is effected by an attendant who merely switches the contactor of switch 51 from the left-half to the right-hand contact, thereby including the swinger and left-hand contact of the SOTUS unit contacts 42 in the energizing circuit of relay 33, if the SOTUS unit is then in the deactivate condition, or opening the circuit of relay 33 immediately, if the SOTUS unit is then in the activate condition.

It should be noted that the time switch 39 may release relay 36, or switch 51 may be operated to initiate the shutting down of motor 31, even though one or both of the stations 22 and 28 may at that time be receiving a message from telegraph channel 11 through the spacing contact of line relay 12 and operated code contacts BB, GG or CQ of the SOTUS unit. If either or both of these stations should be receiving a message, the SOTUS unit 16 will be in the deactivate condition so that the circuit of motor 31 will be maintained until the SOTUS unit is restored to the activate condition in response to the end-of-message signal. As previously stated, the response of the SOTUS unit to this signal results in the unlocking of any operated code contacts so that either or both of the stations 22 and 28 would be disconnected before motor 31 is shut down.

Although a specific embodiment of the invention has been shown in the drawing and described in the foregoing specification, it will be understood that the invention is not limited to such specific embodiment but is capable of modification, rearrangement, and substitution of parts and elements, without departing from the spirit of the invention.

What is claimed is:

1. In a telegraph switching system, a telegraph transmission channel, a signal responsive selector mechanism having switching contacts operable in response to message directing codes received over said channel for connecting telegraph stations to receive messages from said channel, deactivating means for precluding operation of said switching contacts in response to message signals, a driving motor for said signal responsive selector mechanism having an energizing circuit, circuit closure means included in said energizing circuit, operating means for said circuit closure means, and supervening means for maintaining said circuit closure means operated contemporaneously with said deactivating means.

2. In a telegraph switching system, a telegraph transmission channel, a selector mechanism having switching contacts operable in response to message directing codes received over said channel, means responsive to codes intervening said message directing codes and message text codes for blocking unoperated ones of said contacts against operation, a driving motor for said selector mechanism having an energizing circuit, and motor circuit control means signal responsively effective concurrently with said blocking means for precluding interruption of said energizing circuit.

3. In a selector mechanism having a driving motor and a signal responsive selector magnet, an energizing circuit for said motor, switching contacts selectively operable under the control of said selector magnet, selectable means responsive to said selector magnet for rendering said contacts unresponsive to said selector magnet, and means effective in concurrence with the unresponsive condition of said contacts for precluding interruption of said motor energizing circuit, said last-mentioned means being capable, upon restoration of selectability to said contacts, of interrupting said energizing circuit and of rendering said selector magnet unresponsive to signals.

4. In a selector mechanism, a signal responsive selector magnet, a driving motor for said selector mechanism, an energizing circuit for said motor, switch means for closing and opening said circuit, and means for maintaining said selector magnet unresponsive to signals during deceleration of said motor following opening of said circuit by said switch means.

5. In association with a telegraph switching instrumentality having a driving motor and comprising a signal responsive selector mechanism conditionable in response to an activating signal to cause switching operations to be selectively performed and thereafter conditionable in response to a deactivating signal to cause switching operations to be prevented, circuit control means for closing and opening the circuit of said driving motor, and means supervised by said signal responsive selector mechanism so as to be operably effective upon said circuit control means only in the activate condition of said signal responsive selector mechanism to cause the opening of said motor circuit by said circuit control means.

ARLO RALEIGH EGGENSPERGER.

No references cited.